United States Patent [19]
Ziegler

[11] 3,768,097
[45] Oct. 23, 1973

[54] SIGNAL DATA PROCESSOR FOR A PULSE COHERENT RANGE-GATED DOPPLER RADAR SYSTEM

[75] Inventor: Bernard A. J. Ziegler, Paris Ve, France

[73] Assignee: International Standard Electric Corporation, New York, N.Y.

[22] Filed: Dec. 29, 1971

[21] Appl. No.: 213,704

[52] U.S. Cl. ................................. 343/9, 343/16 R
[51] Int. Cl. .............................................. G01s 9/44
[58] Field of Search ............................. 343/9, 16 R

[56] References Cited
UNITED STATES PATENTS

| | | | |
|---|---|---|---|
| 3,579,237 | 5/1971 | Steingart et al. | 343/16 R |
| 3,482,244 | 12/1969 | Gadenne | 343/16 R |
| 3,444,555 | 5/1969 | Hammer | 343/16 R |
| 3,648,225 | 5/1972 | Kritz et al. | 343/9 |

Primary Examiner—Benjamin A. Borchelt
Assistant Examiner—G. E. Montone
Attorney—C. Cornell Remsen, Jr. et al.

[57] ABSTRACT

A target bearing angle refinement device for use in a radar set such as a coherent pulse Doppler radar. The radar phase detector output containing a Doppler modulation component is applied to range selector circuits which are narrow, range increment gating devices providing Doppler (MTI) filtering with restored range information. Target bearing width is determined as a target echo signal crosses an amplitude threshold (increasing and decreasing) by sampling a continuously encoded bearing description as the antenna rotates and differencing the beginning and ending values. A read-only memory is sampled to obtain a correction as a function of a target's width in the bearing coordinate, and the correction is added algebraically to a "half-sum" of the beginning and ending bearing values.

6 Claims, 16 Drawing Figures

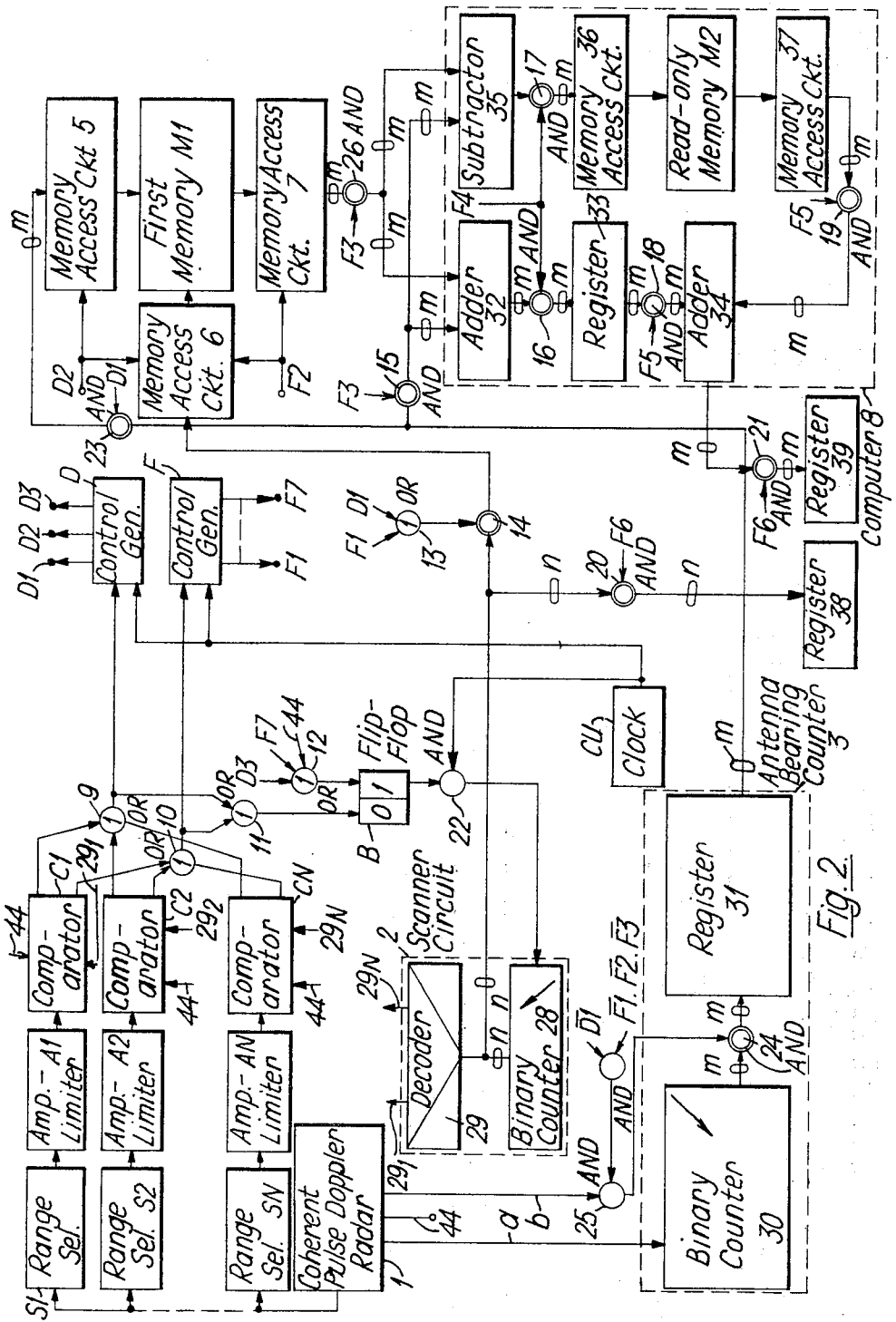

Fig.4a.
Fig.4b.
Fig.4c.
Fig.4d.
Fig.4e.
Fig.4f.
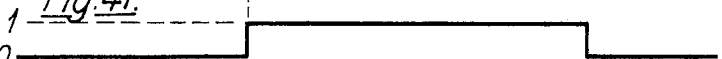
Fig.4g.

SIGNAL DATA PROCESSOR FOR A PULSE COHERENT RANGE-GATED DOPPLER RADAR SYSTEM

CROSS REFERENCE TO RELATED APPLICATIONS

This application is filed under the provisions of 35 U.S.C. 119 with claim for the benefit of the filing of an application covering the same invention filed Dec. 29, 1970, Ser. No. 70,46962, in France.

BACKGROUND OF THE INVENTION

1. Field of The Invention

The invention relates to Radar Systems and more particularly, to refinement of target angle determination circuits.

2. Description of the Prior Art

Coherent pulse-Doppler radar has been utilized in both wholly analog form and in various digitally coded forms.

The textbook "Radar Handbook" by Merrill I. Skolnik, a McGraw Hill book (1970), provides a general state-of-the-art background. Chapter 17, on MTI Radar, is particularly pertinent.

A basic fact of pulsed radar systems concerns the return of echo signals at a constant time interval after radiation of each successive transmitted pulse, corresponding to the range of the corresponding reflecting object from the radar. It is sometimes desired to have signals from objects located at all other ranges eliminated from consideration. Such a selection is obtained by applying received signals to an electronic gate, called a range gate, which is open only for a predetermined time after each pulse radiation. The time during which the said gate is open depends on the range dimension of the area of interest.

In certain known radars, the received signals are applied to a series of range gates which correspond to adjacent range increments and which are sequentially opened, once per repetition period. Thus, it is possible to follow echo movement in range and to determine at any time the distance thereof from the radar by observing the rank of the range gate wherein the echo occurs at any given time.

In the case of pulse coherent Doppler radars, the phase detector output signal is applied to such range gates and each range gate is followed by circuits for eliminating fixed echoes. Such a circuit arrangement forms, in combination with the range gates is what will be hereafter called a range selector. Included are; a "boxcar" type sampling circuit, a band-pass filter called a Doppler filter that passes only components having frequencies between a few hertz and F/2, (where F is the radiated pulse repetition frequency), a detection circuit, an integration circuit such as a low-pass filter, and a threshold circuit. The low-pass filter output signal singles out the amplitude modulation caused by the radiation pattern (scan modulation) when the radar antenna beam scans the mobile echo. Duration of that signal is equal to antenna beam dwell time on the particular target. For accurately determining echo bearing, it is necessary to determine, on the one hand, the maximum amplitude echo signal point and, on the other hand, the bearing corresponding to the said point.

The particular manner in which the present invention provides refined bearing data and the nature of the improvement over the prior art, will be understood as this description proceeds.

SUMMARY OF THE INVENTION

The problem, reduced to a simple definition, is to compensate a conventionally determined target bearing value for the inconstant determination of the "center of gravity" (mid-point of envelope of hits) of targets of varying bearing width due to "box-car detection" effect in the coherent pulse-Doppler detection process. Stated otherwise, the asymmetry is related to antenna beam pattern characteristics and range (as it affects signal strength) in view of the inherent MTI filter slope characteristics.

This asymmetrical effect is a varying but predeterminable amount in the bearing coordinate. In the present invention the necessary correction, plus a small constant amount for inherent computing delays, is catalogued in a read-only memory as a function of encoded target bearing width.

A computer circuit samples the continuous antenna bearing description (which is preferably in digital form) at the angular beginning and end of the target hits, and computes the difference, which is a measure of target angular width, including the "stretch-out" error due to the aforementioned box-car effect. That difference signal is then used to address the read-only memory to obtain a suitable correction corresponding to the target width thus determined. A separate computation determines (also preferably in digital code) the half-sum of the aforementioned target beginning and ending bearing values, which may be thought of as the tentative target center in angle. The algebraic addition of the correction to the so-called half-sum (a net subtraction actually), produces the refined azimuth code for the specific target.

In a pulse coherent Doppler radar wherein phase detector output signal is applied to a set of range selectors, the present invention provides; circuitry for cylically scanning the range selector outputs, a comparison circuit for determining times at which selector output signal is passing over and subsequently under a predetermined threshold, a first memory for storing the antenna bearings at those time positions. Computing means generates a value for half the sum and another for half the difference of beginning and ending echo bearings. A second memory addressable by the code representing bearing difference stores bearing correction values which are then added to the aforementioned bearing half-sum values to refine the bearing determination provided as an output.

The general object of the present invention may be said to be provision of a device for accurately determining the bearing of a target echo and the range increment in which the said target echo is received, the bearing and range information derived being in a form directly usable by a digital computer.

Other objects, features and advantages of the present invention will appear from the following description of an embodiment, undertaken in conjunction with the accompanying drawings, wherein.

BRIEF DESCRIPTION OF THE DRAWINGS

FIG. 2 shows an overall block diagram of a device according to the invention.

FIGS. 4a through 4g show waveforms useful for understanding the operation of the circuit of the FIG. 3.

DESCRIPTION OF THE PREFERRED EMBODIMENT

Referring now to FIG. 1, the a through g symbols will be discussed. FIG. 1a is an electronic coincidence gate, commonly called an AND circuit, which provides a positive signal at its output when its inputs are simultaneously receiving positive signals. If signals applicable to each of the two inputs are called A and B respectively, this circuit performs the logic condition denoted as A.B.

Figure 1A:
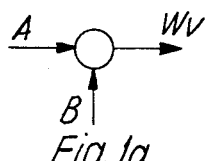
FIGS. 1a through 1g show symbols used in the drawings.
Figure 1B:
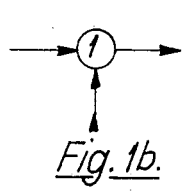

FIG. 1b is an electronic mixer gate, commonly called an OR circuit, whose output provides a positive output signal when a positive signal is applied to at least one of its inputs. If signals applicable to each of its inputs are called C and D respectively, the circuit performs the logic operation C + D.

Figure 1C:
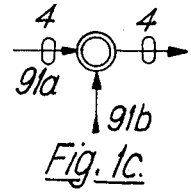

FIG. 1c shows a multiple AND circuit, i.e., comprising in the case of this example, four AND circuits, each one having a first input connected to one of the wires 91a and the other input connected to a common wire 91b.

An AND circuit input will hereafter be considered as activated when a signal is applied to the said input, and an AND circuit will be considered as "open" when all its inputs are simultaneously activated.

Figure 1D:
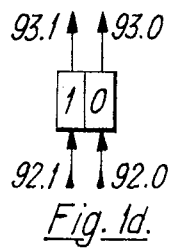

FIG. 1d shows a bistable circuit or flip-flop to which a control signal is applied at one of its inputs 92-1 or 92-0 to cause it to assume the logic state 1 or the state 0, respectively. A voltage of the same polarity as the applied control signal results, either at the output 93-1 when the flip-flop is in the state 1, or at the output 93-0 when it is in the state 0. If the flip-flop is referenced B1, the logic condition meaning that it is in the state 1 will be written B1, whereas $\overline{B1}$ indicates the state 0.

Figure 1E:
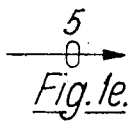

FIG. 1e indicates the designation of leads in a group; in the case shown, there are five discrete leads.

Figure 1F:
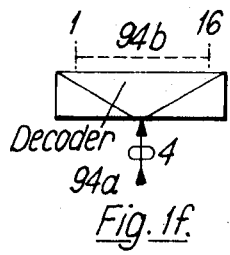

FIG. 1f depicts a decoder which, in the case of the example, converts a four-bit binary code applied by the wire group 94a into a 1 out of 16 code. That is, a signal appears on only one lead among the 16 leads 94b for each digital numbers applied to the decoder input.

Figure 1G:
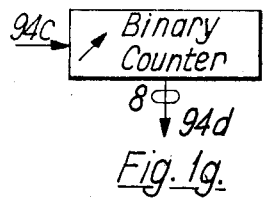

FIG. 1g depicts a four-digit binary counter having 16 possible positions (binary coded outputs). The counter is stepped from one position to the next by pulses applied to the wire 94c.

Referring now to FIG. 2, the combination of the invention may be described. A set of N range selectors, S1 through SN, receive output signals from the phase detector of the pulse coherent Doppler radar 1. A set of amplifier-limiters A1-AN and a set of N comparators (C1-CN) which, in conjunction with the scanner circuit 2, determine the times of the leading and trailing edges of echoes occurring in a given range gate are included as shown. Also included are: an antenna bearing binary counter 3, a first memory M1 and access circuits 5, 6 and 7, for storing N bearing codes, a computer circuit 8 designed for determining the echo bearing code from echo leading and trailing edge bearing codes, electronic gates 26 (9 channel) for performing code transfers between the various registers of the device, a clock circuit CU, a flip-flop B and circuits D and F designed for controlling the aforementioned electronic gates, and registers 38 and 39 wherein are stored the echo bearing code and the identifying code for the range increment in which the said echo is detected.

Range selectors S1-SN have been hereabove defined and are well known, per se, consequently, additional description of them is not necessary.

Amplifiers-limiters A1-AN may be of known type. These operate to convert the amplitude modulated echo signal into a square signal envelope whose leading and trailing edges define echo beginning and end respectively. See FIG. 4a in that connection.

The scanner circuit 2 comprises binary counter 28 and decoder circuit 29 having n output leads $29_1$-$29_N$ which are respectively connected to the comparators C1-CN. For simplification purpose, it will be assumed that the counter 28 includes n stages such that $2^n=N$ and that the counter 28 is stepped by one position by each pulse applied by the clock circuit CU via the AND circuit 22.

The bearing counter 3 is formed by m-stage binary counter 30 (which is stepped synchronously by pulses delivered on the lead a from the antenna, when rotating), and register 31 wherein are successively stored the bearing codes delivered by the counter 30. This transfer to storage is made through the multiple AND circuit 24 controlled by a signal applied via the lead b, applying a train of pulses of frequency double that of the step pulses applied to the counter 30 and intercalated between the said pulses. In the presence of the signal $\overline{D1}$ or $\overline{F1}.\overline{F2}.\overline{F3}$, transfer between 30 and 31 can only occur when the register 31 is not under reading, i.e., if 31 is "behind" in its count.

Figure 3:
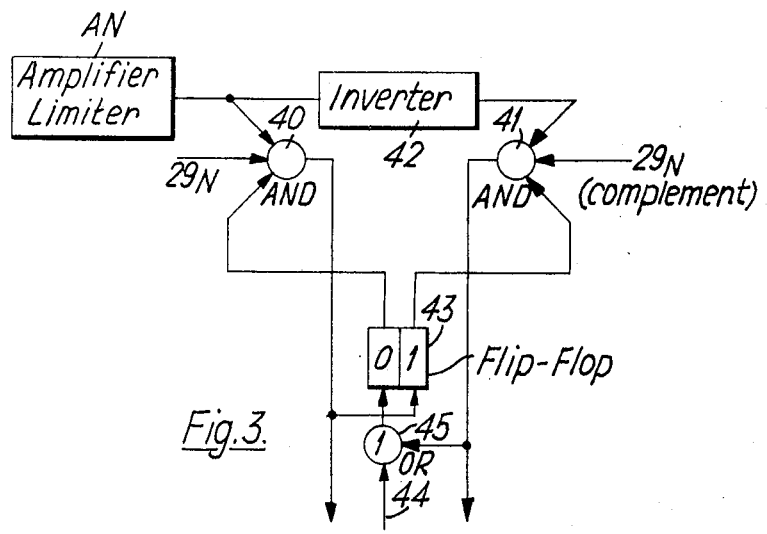
FIG. 3 illustrates, in more detail, a block-schematic diagram of one of the C circuits of FIG. 1.

FIG. 3 shows a preferred circuit arrangement for comparator circuits C1-CN of FIG. 1, the purpose of which is to determine, for each range increment, echo beginning and end. Such a circuit (FIG. 3) comprises two AND circuits 40 and 41, an inverter 42 and a flip-flop 43. Each AND circuit receives three signals, viz., the amplifier-limiter output signal (FIG. 4a waveform) applied to the AND circuit 40 with its complement signal (FIG. 4d ) being applied to AND circuit 41; pulses from corresponding outputs of the scanner 2 (FIG. 4b ) applied to both AND circuits; and the signal of state 0 from flip-flop 43 applied to the AND circuit 40 while signal 1 is applied to the AND circuit 41.

Such a circuit as shown in FIG. 3 operates as follows: When switching the radar 1 on, a pulse applied via the lead 44 to one input of the OR circuit 45 resets the flip-flop 43 to the state 0. The first pulse of the signal being analyzed coinciding with the selector output signal, passes through the AND circuit 40 and forms the FIG. 4c identifying pulse beginning. This pulse is applied to set the flip-flop 43 to the state 1 (FIG. 4f), that state change occurring only with the trailing edge of the said pulse. The first radar signal pulse that occurs after the selector signal trailing edge, passes through the AND circuit 41 and determines the echo end (FIG. 4e). That pulse is applied to reset the flip-flop 43 to state 0 (FIG. 4f). with the said pulse trailing edge. FIG. 4f shows the signal occurring at output 1 of flip-flop 43, and FIG. 4g shows the complement signal occurring at output 0.

The memory M1 is designed for storing N m-bit binary words, each binary word corresponding to a bearing code, that is, as hereafter described, the echo beginning bearing. The memory M1 is, for example, a word core memory including N rows of m cores. Access circuits 5, 6 and 7 are of a type operative with core memory circuits of well known types.

Computer circuit 8 comprises a first adder 32 which performs modulo $2^m$ summation of the two bearing codes applied. A subtracter 35 performs modulo $2^m$ subtraction of the two bearing codes. A read-only memory M2, including for example, a diode mattrix, and access circuits 36 and 37 therefor, stores corrective terms to be added to half the bearing code sum to obtain bearing corresponding to echo maximum. AND circuits 16–19 perform the various transfers required in implementing that operation.

Corrective terms stored in the memory M2 take into account, the constant delay due to signal processing and also the dissymmetry of range selector output signal.

Indeed, if range selector output signal was symmetric, correction corresponding to signal processing duration would be sufficient; however, an inherent dissymmetry results from elongated signal trailing edge beyond that of a symmetric signal. The higher the signal amplitude, the greater is this trailing edge duration exaggeration. Consequently, bearing determined be half the sum would be greater than actual bearing and the correction required for balancing that dissummetry must be negative. As processing time correction is also negative, the entire correction is negative.

Control generator circuts D and F, respectively, provide signals D1-D3 and F1-F7, as well as complements thereof when they receive an echo beginning signal (for circuit D) or an echo end signal (for circuit F) from the comparators. In fact, the said signals are short duration pulses and, by way of example, circuits D and F may each consist of a counter-decoder assembly which is stepped forward by each pulse delivered by the clock circuit CU.

The operation of the device of FIG. 2 will now be described. Assume that an echo occurs in the range increment defined by the selector S1. The circuit C1 then delivers a pulse which defines the echo beginning. This pulse is applied to circuit D and to OR circuit 11 via OR circuit 9. Flip-flop B, which has been set in state 1 when the radar 1 is turned on by a pulse applied via lead 44, changes to state 0. That closes AND circuit 22 and precludes delivery of pulses by clock CU, which would step counter 28 forward. As soon as an echo beginning pulse is received, circuit D provides, successively, signals D1, D2 and D3. Signal D1 is applied to multiple AND circuit 14 via OR circuit 13 and allows a range code to be transferred from counter 28 to addressing circuit 6 of memory M1. Signal D1 also allows a bearing code to be transferred from register 31 via multiple AND circuit 23 to storage circuit 5 of memory M1. Signal D2, applied to circuits 5 and 6, allows the bearing code to be stored in a row of memory M1, for example the first row. The second row may be thought of as corresponding to the second range increment and so on. Via OR circuit 12, signal D3 resets flip-flop B to state 1, which opens AND circuit 22 and again allows counter 28 to count forward so that the next pulses are applied sequentially to circuits C2-CN.

If there is no echo in any other range increment after several uninterrupted scanning cycles performed by circuits C1-Cn, circuit C1 detects echo end and provides a pulse which, via OR circuit 10, stops counter 28 in the same manner as echo beginning pulse did so, and triggers circuit F which successively delivers pulses F1-F7 to generate the range increment code and echo maximum bearing code as an output.

Pulse F1, applied to AND circuit 14, controls the range increment code transfer into addressing circuit 6.

Pulse F2, applied to circuits 6 and 7, enables reading of bearing code stored in the first row of memory M1, the said code corresponding to echo beginning bearing.

Pulse F3, applied to multiple AND circuits 15 and 26, allows echo beginning and end bearing codes to be transferred into adder 32 and subtractor 35.

Pulse F4 applied to multiple AND circuit 16 allows the binary word, resulting from modulo $2^m$ summation, to be transferred into register 33. That transfer is executed with a one digit shift so as to cause half the sum to appear (equivalent of division by 2). Pulse F4 is also applied to multiple AND circuit 17 and allows addressing of memory M2 by the binary word defining the bearing arc between beginning and end of echo. Thereafter, memory M2 delivers a binary word determining the bearing correction to be made.

Pulse F5, applied to multiple AND circuits 18 and 19, makes it possible to introduce into adder 34, binary words defining said bearing half-sum and the bearing corrective term.

Pulse F6, applied to multiple AND circuits 20 and 21, allows range increment and bearing codes, respectively, provided by counter 28 and adder 34 to be transferred into registers 38 and 39 as system outputs.

Pulse F7, applied to OR circuit 12, resets flip-flop B into state 1 which enables counter 28 to resume counting pursuant to the applied clock pulses.

The above described operation renders obvious the fact that pulses to be analyzed (FIG. 4b) are not continuously provided, since the counter is stopped at the beginning and at the end of each echo. As a result, the clock (CU) frequency must be high enough to avoid causing a bearing error greater than one bearing quantum, at most.

In the case when echo range and bearing data are to be transmitted to a digital computer which is adapted for executing a number of operations on the said data (such as converting bearing-distance polar coordinates into Cartesian coordinates, etc.), it is obvious that memories M1 and M2 may be integral with the digital computer memory and that any addition, subtraction and transfer may be executed by the computer itself according to an appropriate program. Consequently, in FIG. 2, operations executed by elements on the right of the dotted line are actually executed in the digital computer, the latter being fed the echo beginning, echo end and range and bearing code signals. Conversely, the digital computer provides signals $\overline{D1}$, $\overline{F1.F2.F3}$, D3 and F7, the functions of which have been explained.

It is also clear that, in the case when a digital computer is used, circuits located on the right of the dotted line may have an organization different of that shown in FIG. 2. Circuits 32–37, in particular, would be embodied in the computer arithmetic unit and corrective terms would then be computed according to a program instead of being permanently stored.

While the principles of the present invention have been hereabove described in relation with a specific embodiment, it is intended that the said description be regarded as typical and illustrative but not as limiting the scope of the invention.

What is claimed is:

1. A device for refining the accuracy of angular target data in a radar system having an angularly scanning antenna and received signal detection and processing means which have inherently asymmetrical signal detection characteristics in respect to the envelope of hits defining the target angular width, comprising:

angle signal means for continuously defining the angular position of said antenna within the limits of angular scan of said radar system;

hit sensing means for generating a pair of signals, including a first signal at a time indicative of the first hit exceeding a predetermined amplitude threshold and a second signal at a time indicative of the last signal exceeding said threshold, during each cycle of angular scan of said antenna;

subtraction means responsive to said hit sensing means for determining the difference of said first and second signal and thereby producing an output which is a function of target bearing width;

target center estimating means responsive to said hit sensing means for generating a bearing signal which is a half-sum of said first and second signals;

means storing a plurality of bearing correction signals, said means being addressable by the output of said subtraction means for producing a bearing correction signal as a function of said subtraction means output;

and means for adding said bearing correction signal to the output of said target center estimating means to produce a corrected bearing signal.

2. Apparatus according to claim 1 in which said angle signal, said first and second signals, the output of said subtraction means, said half-sum signal, said correction signals and said corrected bearing signal are all defined as being digital codes.

3. Apparatus according to claim 2 in which said received signal detection and processing means in said radar set includes a range selector arrangement with Doppler filters.

4. Apparatus according to claim 3 in which said radar is defined as a coherent pulse Doppler radar and said signal detection and processing means also includes a phase detector within said radar for providing a train of echo signals, which are amplitude modulated by Doppler frequencies to the extent they correspond to moving targets.

5. Apparatus according to claim 4 including amplifying and limiting means responsive to the outputs of said range selectors, comparator means responsive to the output of said limiting means, said comparator means including a signal threshold for developing a control signal as said limiter output exceeds said threshold corresponding to the leading edge of the envelope of hits on a corresponding target during said angular scan and another central signal corresponding to the trailing edge of said envelope of hits, and means for developing said first and second signals in digital form by sampling said angle signal at the time of occurrence of said control signals.

6. Apparatus according to claim 5 in which a memory responsive to said first and second signals is provided for storing said first and second signals after said second signal is generated until the first signal corresponding to the next angular scan cycle, thereby to provide time for operation of said substraction means, said target center estimating means, and said bearing correction signal determination and application to produce said corrected bearing signal.

* * * * *

PO-1050
(5/69)

UNITED STATES PATENT OFFICE
CERTIFICATE OF CORRECTION

Patent No. 3,768,097      Dated October 23, 1973

Inventor(s) Bernard A. J. Ziegler

It is certified that error appears in the above-identified patent and that said Letters Patent are hereby corrected as shown below:

On the Title Page add the following:

[30] Foreign Application Priority Data
    December 29, 1970    France    70 46962

Signed and sealed this 11th day of June 1974.

(SEAL)
Attest:

EDWARD M. FLETCHER, JR.
Attesting Officer

C. MARSHALL DANN
Commissioner of Patents